United States Patent [19]
Hellwarth

[11] 3,928,815
[45] Dec. 23, 1975

[54] METHOD AND APPARATUS FOR OPERATING LASER

[75] Inventor: Robert W. Hellwarth, Los Angeles, Calif.

[73] Assignee: Hughes Aircraft Company, Culver City, Calif.

[22] Filed: June 3, 1974

[21] Appl. No.: 475,714

Related U.S. Application Data
[63] Continuation of Ser. No. 128,458, Aug. 1, 1961, abandoned.

[52] U.S. Cl. .......................................... 331/94.5 Q
[51] Int. Cl. .............................................. H01s 3/00
[58] Field of Search ...................... 331/94.5; 330/4.3

[56] References Cited
UNITED STATES PATENTS
3,353,115  11/1967  Maiman ............................ 331/94.5
3,388,314  6/1968  Gould ................................. 330/4.3

OTHER PUBLICATIONS
*Electronics*, Vol. 33, July 22, 1960, p. 43.
"Optical Maser Action in Ruby," *British Comm. & Electronics*, Vol. 7, No. 9, pp. 674–675.

*Primary Examiner*—Ronald L. Wibert
*Attorney, Agent, or Firm*—W. H. MacAllister; Paul M. Coble

[57] ABSTRACT

A Q-switched laser is disclosed for providing giant pulses of laser energy. A laser medium is employed wherein the lifetime of the upper energy level for the lasing transition is sufficiently long to permit a substantial excess population inversion to develop when the medium is excited under a condition of low regeneration. The laser medium is excited to a condition of population inversion under a first regenerative condition insufficient to achieve laser oscillation but allowing a substantial excess population inversion to develop. Subsequently, the regenerative condition is switched to a condition of high regeneration sufficient to cause the laser medium to emit a pulse of light having a peak power substantially greater than that which would have been emitted if the first regenerative condition were not previously provided.

12 Claims, 1 Drawing Figure

U.S. Patent  Dec. 23, 1975  3,928,815
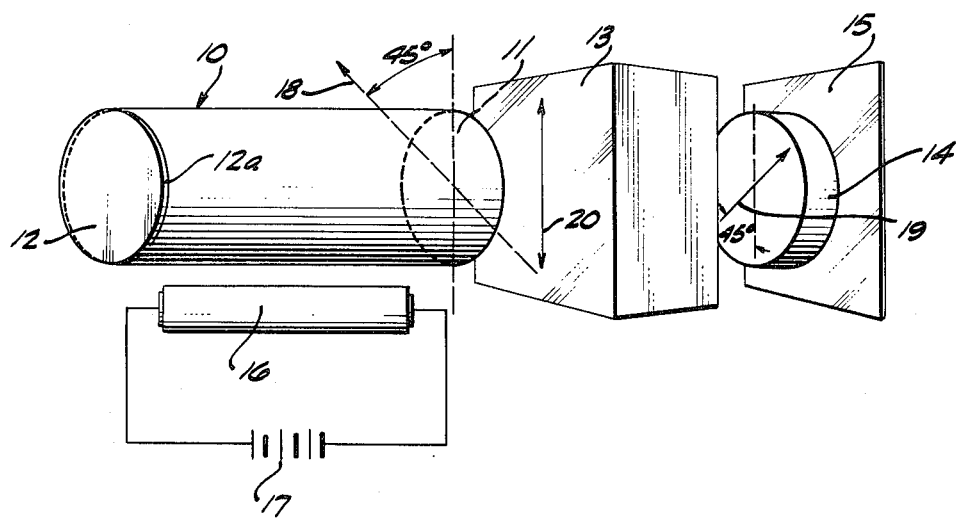

METHOD AND APPARATUS FOR OPERATING LASER

The invention herein described was made in the course of or under a Contract or Subcontract thereunder with the U.S. Air Force.

This application is a continuation of my copending application Ser. No. 128,458, filed Aug. 1, 1961, now abandoned.

This invention relates to the operation and control of an optical maser or laser.

The radiation output from a maser oscillator is well known to exhibit highly monochromatic, coherent, and directional properties. Many methods have been proposed for modulating the output of maser oscillators in all regions of the spectrum. These methods include Zeeman modulation by the variation of an impressed magnetic field, Stark modulation by the variation of an impressed electric field, modulation by the variation of maser pumping rate, and modulation by the variation of external filtering through which steadily emitted maser radiation is passed.

The present invention accomplishes the modulation of the output of a laser by varying the regenerative action of enclosure means which surround the laser material, and which ordinarily supplies enough feedback of the emitted laser radiation, so that conditions necessary to sustain oscillations can be satisfied. When the invention is applied to pulse-modulation of the laser output, it has unique pulse-forming capabilities. In applications of lasers to radar transmission, for example, the decreased pulse rise-time and increased intensities obtainable by the use of this invention, are desirable.

Accordingly, it is an important object of this invention to provide a method which can be used to modulate the output of a laser oscillator in a novel and advantageous manner.

Another object of the invention is to provide a system which permits the production of controlled and relatively intense bursts or pulses of the characteristically coherent, monochromatic and highly directional laser radiation.

A further object of this invention is to provide efficient, practical and positive means for producing an extraordinarily highly excited laser material, so that the material can be made to give up its stored energy on command in the form of a fast, highly intense, and controllable burst of monochromatic, directional radiation from the laser.

Additional objects will become apparent from the following description which is given primarily for purposes of illustration and not limitation.

Stated in general terms, the objects of this invention are attained by providing a method and apparatus for pumping a laser to a highly excited condition, and then converting, on command, the high energy of excitation of the laser material to a coherent light pulse of controllable duration and intensity, by controlled increase and decrease of regeneration in the laser material. This regeneration preferably is produced through enclosure means mounted around the laser material, adapted to feed back to the laser material emitted laser light energy, while the laser material is being excited from some external pump source. Variation of the feedback and the corresponding regeneration by changing the condition of the enclosure means, is performed so that sometimes regeneration of the laser light is low, causing high excitation and high energy storage in the laser material from the pump, and so that sometimes regeneration is very high to cause the laser material to give up its high, stored energy quickly but controllably. This variation of regeneration can be achieved by any suitable means, such as by the use of electro-optical shutters, piezo-optical devices, semiconductor devices, electromechanical devices, polarizers, etc. In a preferred embodiment an electrooptical Kerr cell is used in combination with a polarizer and a light reflecting surface, to vary the regeneration produced in the laser material.

A more detailed description of a preferred embodiment of this invention is given below with reference to the accompanying drawing, which is a schematic side elevational view showing a system according to the invention using an electro-optical Kerr cell, a polarizer, a reflector and pumping means with a solid rod of laser material.

A pink synthetic ruby rod 10, employed at room temperature, and prepared by methods known in the art by doping aluminum oxide with chromium oxide, is shown in the drawing as the laser material. Both ends of ruby rod 10 are polished to produce flat, parallel end surfaces 11 and 12. Upon one end surface 12 of the rod 10 is placed, or deposited, a flat reflecting surface 12a, which returns to the rod a certain fraction of the light energy emitted from the laser material in the rod, and impinging upon reflecting surface 12a. At the other end surface 11 of the rod 10, the fraction of emitted light energy which is returned back into the rod, is varied by coaxially aligning with the rod an electro-optical Kerr cell 13, a polarizer 14, and a reflector 15 having a highly reflecting surface. The total effect at the ends of rod 10 is therefore, to vary the regeneration of laser light energy and hence to control laser action. A laser pumping means 16, such as a flash lamp, connected to a power supply 17 is shown schematically as being operatively associated with rod 10. Pumping means 16 is used to excite the laser material in rod 10 to stimulate emission therefrom.

The orientation of the ruby crystalline axis of rod 10 is properly arranged so that laser emission from the rod is plane polarized throughout the rod and also on leaving end surface 11 thereof. The direction of natural polarization in oriented ruby rod 10 is indicated by arrow 18. Polarizer 14 has its axis, signified by arrow 19, oriented at right angles to the direction of arrow 18. In this arrangement, when Kerr cell 13 is inactive, radiation at the laser transition stage passes through the Kerr cell and is rejected from the system by polarizer 14. Consequently almost no emission radiation feedback occurs, and no corresponding regeneration is produced in the laser material in rod 10 in this situation. High storage of energy from the pump source 16 takes place in the maser material in this stage.

However, when Kerr cell 13 is activated by applying a proper amount of an electric field thereto at an angle of 45° to the direction of arrow 18, as indicated by arrow 20, the polarized laser emission radiation then has its plane of polarization rotated through an angle of 90°. In this situation the laser emission radiation from rod 10 passes substantially unattenuated through polarizer 14, to be reflected by the reflecting surface of reflector 15. The thus reflected radiation returns through polarizer 14, and Kerr cell 13, and re-enters ruby laser rod 10, oriented through an angle of 180° out of its original phase, just as if it were reflected from a simple reflecting surface at end surface 11 of the rod. On the opposite end surface 12 of rod 10 the highly reflecting surface 12a is made to be a partially transmitting surface, out of which the output pulse is transmitted and employed for the desired purpose, such as ranging for example.

Alternatively, the output pulse can be transmitted through reflector 15 by making the reflecting surface thereof partially transmitting. In another alternative embodiment the output pulse can be transmitted through both the reflecting surface of reflector 15 and the opposite end surface 12a of rod 10, by making both of these surfaces partially transmitting. In a further alternative embodiment the reflecting surface 12a may be separated from the end 12 of the rod 10 and one of the foregoing may be again true. In still another alternative embodiment two Kerr cell arrangements such as described above may be placed one at each end of rod 10 and both operated together, or independently, to produce modulation. Again the output laser light energy may be transmitted through one or both ends of the apparatus, as described hereinabove. In each of these alternative situations, and in the preferred embodiment described above with reference to the drawing, when Kerr cell 13 is activated, the light energy emitted by the laser material of rod 10 is reflected back and forth many times between the end surfaces 11 and 12 of the rod, so that there is a very high degree of regeneration. When Kerr cell 13 is de-activated, there is very little reflection of light back and forth between end surfaces 11 and 12 of rod 10, and a very high degree of energy storage takes place in the laser material of the rod during this phase of low output of light energy. Operation in this manner produces the effect of modulating the light energy output of the laser, as the electric field in Kerr cell 13 is varied. The modulation produced is especially pronounced in a pulsed operation which produces pulses of intensity many times greater than ordinarily obtainable. This is discussed in more detail below.

The pulse-modulation operation of the device shown in the drawing proceeds in two phases. In the first phase, the enclosure means for the laser material of rod 10 initially is made to cause little or no regeneration because the enclosure means comprising the assembly of Kerr cell 13, polarizer 14 and reflector 15, at the right end of the laser material, serves to return very little laser emission back into the laser material. The laser material of rod 10 has been chosen so that, under strong pumping by pumping means 16, a large population excess builds up at the laser transition stage when there is little or no regeneration. This happens when rod 10 of the laser material is made of sufficiently small dimensions so that the lifetime of the laser transition stage is not shortened much by stimulated emission, and the pump rate can exceed the laser transition rate.

In the second phase, the fraction of laser light energy reflected by the variable part of the assembly of Kerr cell 13, polarizer 14 and reflector 15 at the right end of the enclosure means, is made high, so that a very high degree of regeneration develops in rod 10 for polarized laser light energy passing between end surface 12a and reflector 15. While this high degree of regeneration is occurring, or shortly thereafter, the regeneration causes the population excess, which has been built up in the laser material of rod 10 in the first phase, to equalize itself by very rapid stimulated emission of photons. When the effective reflectivity of the enclosure material is switched to its higher value in a space of time shorter than a certain critical time value, a pulse of radiant energy of a certain maximum peak intensity and minimum duration is emitted from the laser material of rod 10, regardless of how much more rapidly the reflectivity is switched to its final value.

In this case, the resulting pulse is characterized by having a rise time faster than the natural response time of the enclosure, but it decays at roughly its natural rate. When, on the other hand, the effective reflectivity of the enclosure material is switched more slowly than in this critical time, the emitted pulse of radiant energy has roughly the same total integrated intensity as in the previous case, but a longer time of duration (i.e., during the whole switching time plus residual decay time), and therefore correspondingly less peak intensity. Consequently, the output pulse can be modulated both in intensity and duration by varying the switching time in this manner.

Furthermore, it will be seen that when the final value of the switched reflectivity of the enclosure material is changed from pulse to pulse, the pulse height is in this manner, also modulated. After the pulse is over, the regeneration (i.e., effective reflectivity) of the enclosure material can be restored to its initial, low value. The population excess then is built up again at approximately the pump rate. After this, the entire procedure again can be repeated at will.

It will be understood that, although the apparatus shown in the drawing has been described above as being oriented so that the axis of polarizer 14, indicated by arrow 19, is positioned at right angles to arrow 18, indicating the direction of natural polarization of the laser emission of rod 10; the apparatus also can be operated with the orientation such that arrow 19 (the axis of polarizer 14) is parallel to arrow 18 (the direction of natural polarization of laser emission from rod 10). In such cases, the apparatus is operated exactly as described above, except that Kerr cell 13 is made "active" where previously it was stated to be made "inactive."

Without the use of polarizer 14 in the apparatus shown in the drawing, some (though less) change in the degree of regeneration occurs when Kerr cell 13 is activated, as compared to the situation when the cell is inactivated. The resulting change is sufficient to afford a working arrangement for some applications of the invention. Also, the placement of polarizer 14 can be changed to a position between end surface 11 and Kerr cell 13, or between laser material rod 10 and a polished surface equivalent in function to end surface 12, and efficient operation likewise will result, as described above with reference to the arrangement shown in the drawing.

An example, illustrating the operation of one embodiment of the invention, is as follows: The apparatus arrangement employed was as shown and enumerated in the drawing, except that the polarizer 14 was eliminated for reasons of simplicity at the possible cost of some degradation of operating potential. Also, in this embodiment, the orientation of the apparatus was such that when the Kerr cell 13 was activated, the laser light energy was not rejected from the system as would have happened if the polarizer 14 were in place, but rather it was reflected back into the rod 10 of laser material. However, the amount of regeneration was lowered because the reflected light energy was, as a result of the action of Kerr cell 13, all or partly of a different polarization from that of the laser light beam, and hence was ineffectual in causing further laser emission on this first reflection. But, after one or more subsequent reflections, this action of Kerr cell 13 restores the multiply-reflected beam to the proper laser polarization, and it is again effective in producing laser emission. Nonetheless, the net result is reduced regeneration for, when the Kerr cell is activated, the light suffers more losses upon reflection at the end surface 12a and reflector 15, for a given number of active laser passes than when the Kerr cell is switched off (in which event every pass undergone by laser light is effective in producing or regenerating more laser light in the laser material of rod 10).

The pink ruby rod 10 employed as the laser material was of conventional design and in the shape of a cylinder 2 cm long and 1 cm in diameter. The reflector 15 was an optical flat on which was deposited a thin partially transmitting layer of silver. The end surface 12a also was a thin partially transmitting layer of silver deposited directly on the end surface 12 of the ruby rod 10. Observations of laser light were made from both ends of the apparatus, as both end surface 12a and reflector 15 were partially transmitting.

The experimental procedure was as follows: The flash lamp pump 17 was activated while Kerr cell 13 was active, causing the laser populations to build up to a highly inverted state in the presence of low regeneration. After about 500 microseconds the Kerr cell 13 was de-activated, a process which took a time of the order of 0.1 microsecond owing to the switching speed of the Kerr cell power supply. During this time the stored energy in the population excess was converted to a pulse of laser light. The peak intensity of this pulse was measured to be 20 ± 5 kilowatts. From this number it was estimated that about a 1% enhancement of the population of the upper laser level over that of the ground state had been achieved.

Moreover, conventional characteristic spontaneous pulsations were observed about 20 microseconds after the Kerr cell had been de-activated. These characteristic spontaneous pulsations were of the order of 200 watts in peak intensity. Therefore, by the use of the method of the invention, an excitation of the laser material had been achieved which was about 100 times the excitation of the ruby obtained in conventional operation.

The giant pulse obtained by the use of the method of the invention, lasted 0.1 microsecond and had a rise time less than 0.03 microsecond. This was a faster rise time than has been observed for conventional characteristic spontaneous pulsations, obtained during conventional laser operation.

It will also be understood that the effective reflectivity of the enclosure means can be changed in accordance with the method and apparatus of the invention by other suitable means than by the use of a Kerr cell with one or more polarizers and partially reflecting surfaces. For example, rapidly movable mirrors can be used to change the effective reflectivity. Similarly, a sheet of semiconductor material with variable reflectivity or optical activity; a stack of sheets or plates of dielectric material which can be compressed to vary the reflectivity or optical activity of the stack; or a cell filled with a gas or vapor whose reflectivity or optical activity varies with its degree of ionization can be used to vary or change the effective reflectivity of the enclosure means of the laser material. Also, a coupling hole or exit apparatus leading to and from one of the above-described enclosure means can be used in connection with the laser material. Other similar variations and combinations of elements or components, within the skill of the art, are contemplated as being within the scope of the invention.

It will be seen that this invention can be used to bring about a highly excited state in the laser material, and also to produce a high degree of regeneration, through the proper variation of the regenerative action of the enclosure means surrounding the laser material. By the use of this invention, amplitude modulation of the laser output can be brought about. In one special kind of operation, rapid, intense and controllable bursts or pulses of coherent monochromatic and high durational electromagnetic radiation can be produced. The underlying principle in the latter, pulse-modulation, case involves rapidly converting the excitation energy of particles in the laser material, which have been pumped into excited states, into coherent electromagnetic energy by the sudden application of very high regenerative feedback of radiation, which would otherwise be emitted relatively slowly from the excited particles of the laser material. Specifically, the invention performs both the preparation of a very large number of excited particles in the laser material, and the sudden application of regenerative feedback by varying the regenerative power, or effective reflectivity, of the enclosure means surrounding the laser particles while the laser material is being pumped continuously.

Obviously many other modifications and variations of the present invention are possible in the light of the above teachings. It is therefore to be understood that within the scope of the appended claims the invention can be practiced otherwise than as specifically described.

What is claimed is:

1. A laser device comprising: a medium capable of being excited to a condition in which population inversion occurs between a pair of energy levels having an energy separation corresponding to a light frequency, means for pumping said medium to said condition of population inversion whereby stimulated emission of light energy at said frequency occurs, means for regeneratively feeding a portion of said light energy back to said medium, and means for varying the regenerative energy fed back to said medium between a first regenerative condition which precludes laser oscillation and a second regenerative condition which permits laser oscillation.

2. A laser device comprising: a medium capable of being excited to a condition in which population inversion occurs between a pair of energy levels having an energy separation corresponding to a light frequency, means for pumping said medium to said condition of population inversion whereby stimulated emission of light energy at said frequency occurs, means for regeneratively feeding a portion of said light energy back to said medium, and means for varying the regenerative energy fed back to said medium between a first regenerative condition in which substantially no regeneration of said light energy occurs and a second regenerative condition in which high regeneration of said light energy occurs whereby laser oscillation is achieved.

3. A laser device comprising: a medium capable of being excited to a condition in which population inversion occurs between a pair of energy levels having an energy separation corresponding to a light frequency, means for pumping said medium to said condition of population inversion whereby stimulated emission of light energy at said frequency occurs, said medium being such that said light energy is polarized in a predetermined plane, reflecting means for reflecting a portion of said light energy back to said medium, polarizer means disposed in the path of said light energy between said medium and said reflecting means for substantially precluding light energy polarized in a preselected plane from returning to said medium without substantially affecting light energy polarized in a plane perpendicular to said preselected plane, said polarizer means being oriented such that said preselected plane and said predetermined plane bear a desired angular relationship to one another, and means disposed in said path between said medium and said reflecting means for altering the plane of polarization of the light energy traveling along said path.

4. A giant pulse laser device comprising: a medium capable of being excited to a condition in which population inversion occurs between a pair of energy levels having an energy separation corresponding to a light frequency and wherein the lifetime of the upper one of said energy levels is sufficiently long to permit a substantial excess population inversion to develop when said medium is pumped under a condition of low regeneration, means for pumping said medium to said condition of population inversion whereby stimulated emission of light energy at said frequency occurs, means for regeneratively feeding a portion of said light energy back to said medium, and means for controlling the regenerative energy fed back to said medium to first provide a first regenerative condition insufficient to achieve laser oscillation and to subsequently provide a second regenerative condition sufficient to cause said medium to emit a pulse of light having a peak power substantiially greater than that which would have been emitted if said first regenerative condition were not previously provided.

5. A giant pulse laser device comprising: a medium capable of being excited to a condition in which population inversion occurs between a pair of energy levels having an energy separation corresponding to a light frequency and wherein the lifetime of the upper one of said energy levels is sufficiently long to permit a substantial excess population inversion to develop when said medium is pumped under a condition of low regeneration, means for pumping said medium to said condition of population inversion whereby stimulated emission of light energy at said frequency occurs, means for regeneratively feeding a portion of said light energy back to said medium, and means for controlling the regenerative energy fed back to said medium to first provide a first regenerative condition in which little regeneration of said light energy occurs and to subsequently provide a second regenerative condition in which high regeneration of said light energy occurs to cause said medium to emit a pulse of light having a peak power substantially greater than that which would have been emitted if said first regenerative condition were not previously provided.

6. A giant pulse laser device comprising: a medium capable of being excited to a condition in which population inversion occurs between a pair of energy levels having an energy separation corresponding to a light frequency and wherein the lifetime of the upper one of said energy levels is sufficiently long to permit a substantial excess population inversion to develop when said medium is pumped under a condition of low regeneration, means for pumping said medium to said condition of population inversion whereby stimulated emission of light energy at said frequency occurs, means for regeneratively feeding a portion of said light energy back to said medium, and means for controlling the regenerative energy fed back to said medium to first provide a first regenerative condition in which substantially no regeneration of said light energy occurs and to subsequently provide a second regenerative condition in which high regeneration of said light energy occurs to cause said medium to emit a pulse of light having a peak power substantially greater than that which would have been emitted if said first regenerative condition were not previously provided.

7. A giant pulse laser device comprising: a medium capable of being excited to a condition in which population inversion occurs between a pair of energy levels having an energy separation corresponding to a light frequency and wherein the lifetime of the upper one of said energy levels is sufficiently long to permit a substantial excess population inversion to develop when said medium is pumped under a condition of low regeneration; means for pumping said medium to said condition of population inversion whereby stimulated emission of light energy at said frequency occurs; reflecting means for reflecting a portion of said light energy back to said medium; and means for controlling the light energy fed back to said medium to first substantially prevent regeneration of said light energy and thereby enable energy storage to occur in said medium, and to subsequently provide high regeneration of said light energy to cause said medium to emit a pulse of light having a peak power substantially greater than that which would have been emitted in the absence of said energy storage.

8. A method for operating a laser device comprising: exciting laser material to a condition in which population inversion occurs between a pair of energy levels having an energy separation corresponding to a light frequency whereby stimulated emission of light energy at said frequency occurs, regeneratively feeding a portion of said light energy back to said material, and varying the regenerative energy fed back to said material between a first regenerative condition which precludes laser oscillation and a second regenerative condition which permits laser oscillation.

9. A method for operating a laser device comprising: exciting laser material to a condition in which population inversion occurs between a pair of energy levels having an energy separation corresponding to a light frequency whereby stimulated emission of light energy at said frequency occurs, regeneratively feeding a portion of said light energy back to said material, and varying the regenerative energy fed back to said material between a first regenerative condition in which substantially no regeneration of said light energy occurs and a second regenerative condition in which high regeneration of said light energy occurs whereby laser oscillation is achieved.

10. A method for substantially increasing the peak power output of a laser device comprising: exciting laser material to a condition in which population inversion occurs between a pair of energy levels having an energy separation corresponding to a light frequency whereby stimulated emission of light energy at said frequency occurs while regeneratively feeding a portion of said light energy back to said material under a first regenerative condition insufficient to achieve laser oscillation, said laser material being such that the lifetime of the upper one of said energy levels is sufficiently long to permit a substantial excess population inversion to develop when said medium is excited under said first regenerative condition; and subsequently switching the regenerative condition to a second regenerative condition sufficient to cause said material to emit a pulse of light having a peak power substantially greater than that which would have been emitted if said first regenerative condition were not previously provided.

11. A method for substantially increasing the peak power output of a laser device comprising: exciting laser material to a condition in which population inversion occurs between a pair of energy levels having an energy separation corresponding to a light frequency whereby stimulated emission of light energy at said frequency occurs while regeneratively feeding a portion of said light energy back to said material under a first regenerative condition in which little regeneration of said light energy occurs, said laser material being such that the lifetime of the upper one of said energy levels is sufficiently long to permit a substantial excess population inversion to develop when said medium is excited under said first regenerative condition; and subsequently switching the regenerative condition to a second regenerative condition in which high regeneration of said light energy occurs to cause said material to emit a pulse of light having a peak power substantially greater than that which would have been emitted if said first regenerative condition were not previously provided.

12. A method for substantially increasing the peak power output of a laser device comprising: exciting laser material to a condition in which population inversion occurs between a pair of energy levels having an energy separation corresponding to a light frequency whereby stimulated emission of light energy at said frequency occurs while regeneratively feeding a portion of said light energy back to said material under a first regenerative condition in which substantially no regeneration of said light energy occurs, said laser material being such that the lifetime of the upper one of said energy levels is sufficiently long to permit a substantial excess population inversion to develop when said medium is excited under said first regenerative condition; and subsequently switching the regenerative condition to a second regenerative condition in which high regeneration of said light energy occurs to cause said material to emit a pulse of light having a peak power substantially greater than that which would have been emitted if said first regenerative condition were not previously provided.

* * * * *